United States Patent

Huntington

[15] 3,642,198
[45] Feb. 15, 1972

[54] SHIFTABLE FLUID CONTROL CIRCUIT

[72] Inventor: Andrew B. Huntington, Waterford, Mich.

[73] Assignee: Ross Operating Valve Company, Detroit, Mich.

[22] Filed: Jan. 19, 1970

[21] Appl. No.: 3,613

[52] U.S. Cl. .................................................................235/201
[51] Int. Cl. ...........................................................G06m 1/12
[58] Field of Search .........................................235/200, 201

[56] References Cited

UNITED STATES PATENTS

| | | | |
|---|---|---|---|
| 3,001,698 | 9/1961 | Warren | 235/201 |
| 3,550,847 | 12/1970 | Scott | 235/201 |
| 3,242,946 | 3/1966 | Chabrier et al. | 235/201 X |
| 3,243,113 | 3/1966 | Welsh | 235/201 |
| 3,326,239 | 6/1967 | Saint-Joanis et al. | 235/201 X |
| 3,342,197 | 9/1967 | Phillips | 235/201 X |
| 3,407,833 | 10/1968 | Brandenberg | 235/201 X |
| 3,502,267 | 3/1970 | Kay | 235/201 |
| 3,303,999 | 2/1967 | Mamy | 235/201 |

Primary Examiner—Richard B. Wilkinson
Assistant Examiner—Lawrence R. Franklin
Attorney—Harness, Dickey & Pierce

[57] ABSTRACT

A plurality of identical three-way normally open poppet valves are so interconnected between a source of momentary signal pressure and an output member or members as to shift this member or members between two alternate positions in response to successive momentary applications of fluid pressure.

4 Claims, 5 Drawing Figures

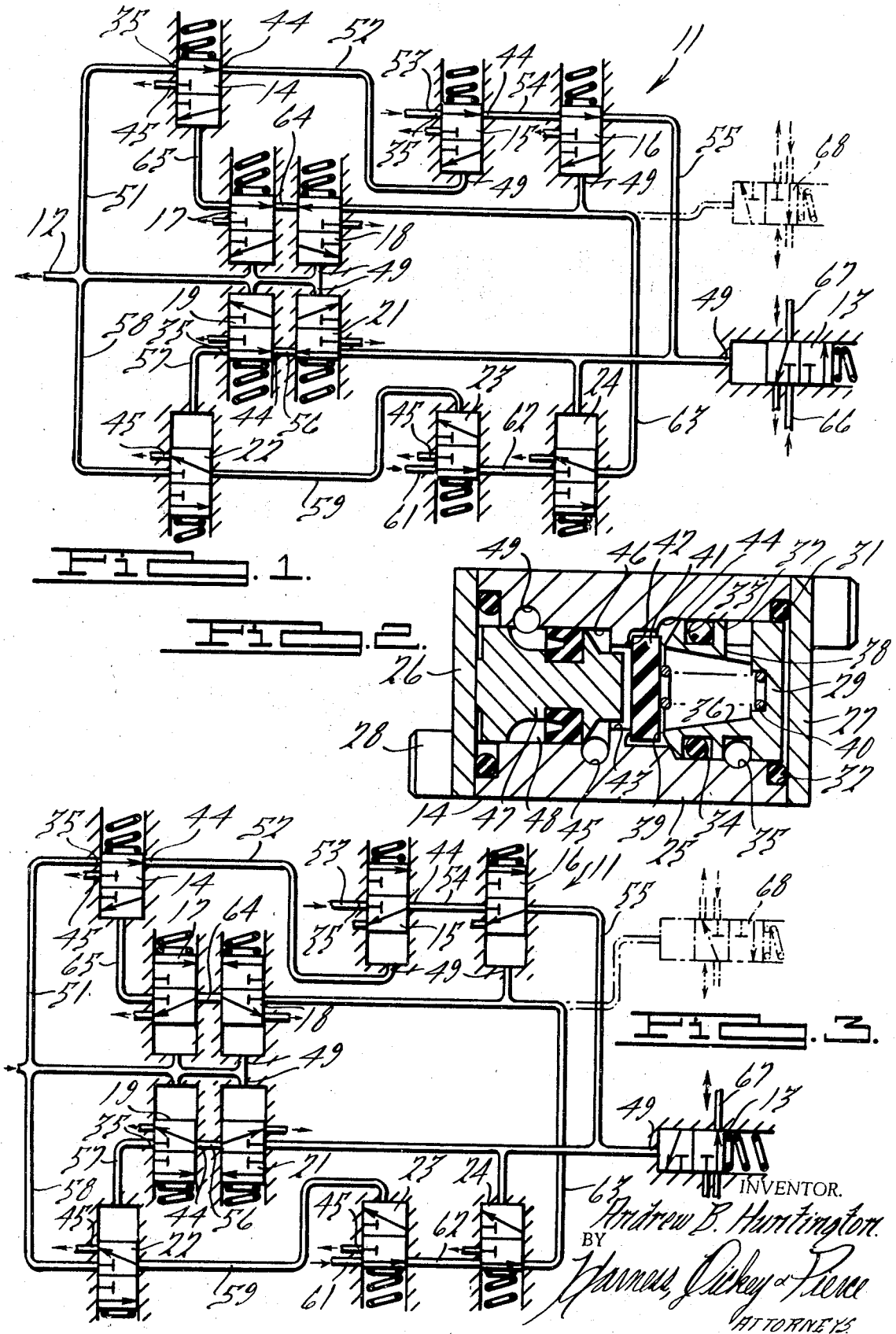

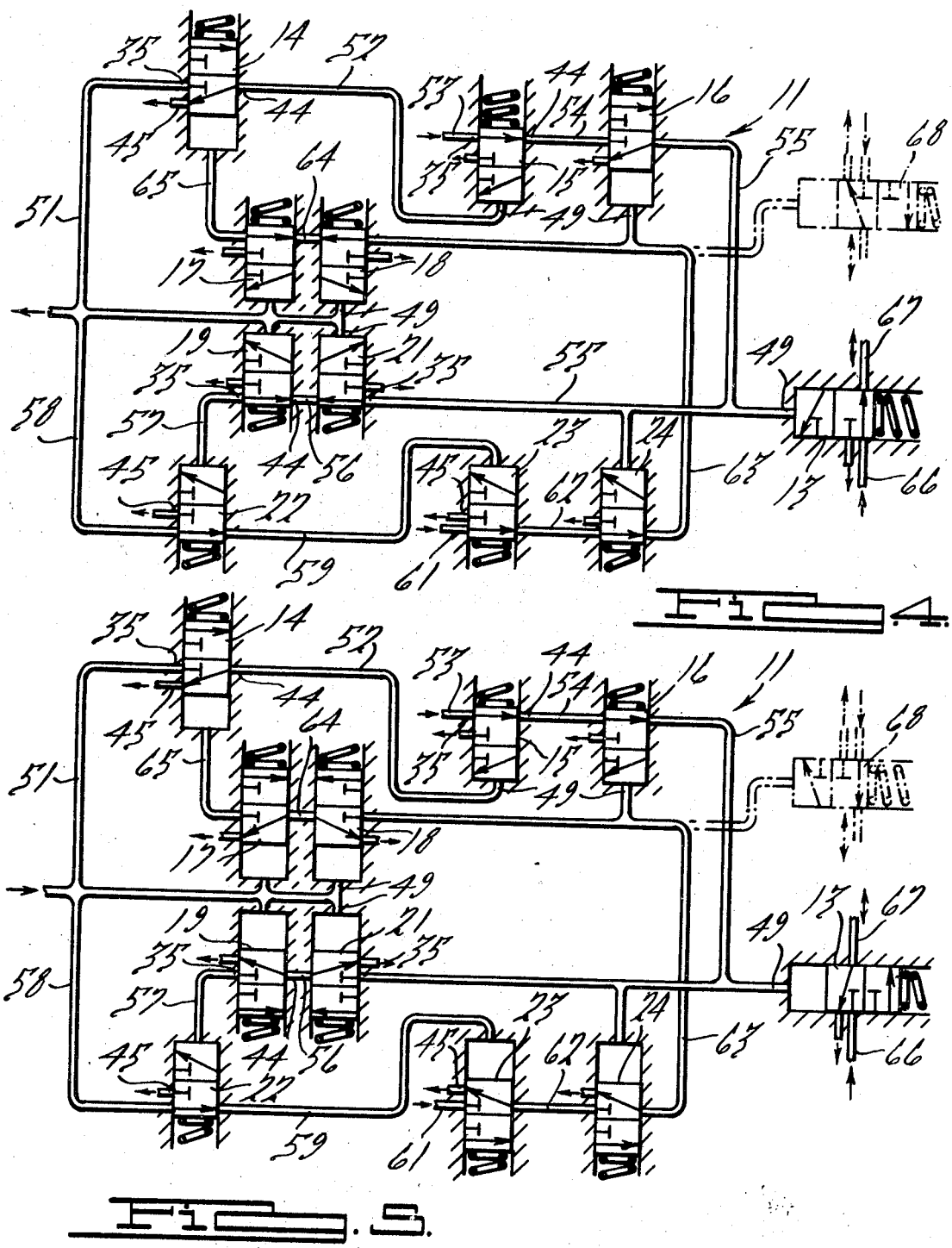

3,642,198

SHIFTABLE FLUID CONTROL CIRCUIT

BACKGROUND OF THE INVENTION

1. Field of the Invention

The invention relates to fluid control devices, and more particularly to mechanisms shiftable between two alternate positions in response to momentary applications of fluid pressure.

2. Description of the Prior Art

The prior art is exemplified by a number of patents issued to the assignee of the present application, namely U.S. Pat. Nos. 2,859,735; 2,921,602; 2,997,066; 3,011,519 and 3,459,224. In some of these prior art devices, mechanical locking means or detents are used to hold the valve elements in certain positions during the cycle. In U.S. Pat. Nos. 2,997,066 and 3,459,224, no detents are used, but these devices have other deficiencies which it is an object of the present invention to overcome. Disadvantages of these prior constructions include the fact that they are relatively expensive to construct, use O-ring seals which impose pressure limitations, occupy considerable space and present substantial and undesirably variable frictional resistance during operation because of the nature of the valve structures. The valving elements in these prior constructions are also more susceptible under certain circumstances to sluggish action, leaking and/or malfunction due to contaminants carried by the air lines and their effect on materials and fits. In addition, none of the prior devices are capable of simultaneously providing two output signals which are opposite in sense.

SUMMARY OF THE INVENTION

According to the invention, a plurality of identical three-way normally open poppet valves are so interconnected as to obtain an on-off bistable output condition with a single input and without the use of mechanical latches. In fluid logic terms, each valve is a "NOT" element, and the system is a binary counter. These valves may be in extremely small sizes such as for pilot control purposes. By suitable orientation, in side-to-side and/or end-to-end contiguous mounting, with all ports opening into a common plane, the valves can be compactly interconnected in a common manifold arrangement.

Although control of the system's output conditions would normally be provided by input pressure pulses of short duration, the trapping of pressure in certain portions of this system during the cycle is carried out by the poppet valves in such a way that no significant limitation need be placed on any portions of the cycle time. The valving elements have relatively short strokes and low frictional resistance thus increasing reliability and rapidity of operation. The poppet valves are less susceptible than spool valves to "hangup" due to contaminants carried by the air line, and the problem of swelling and shrinking of seals such as occurs in resilient sealed spool valves is avoided.

In the illustrated embodiment of the invention, ten such identical poppet valves are used.

BRIEF DESCRIPTION OF THE DRAWINGS

FIG. 1 is a schematic view of the indexing circuit shown at the beginning of a complete cycle with no signal pressure being applied;

FIG. 2 is a cross-sectional view of a single valve shown in its normally open position;

FIG. 3 is a view similar to FIG. 1 but showing the positions of the valves after the pressure of the first signal pulse has been applied and showing the output member in its shifted position;

FIG. 4 is a view similar to FIG. 3 but showing the position of the parts after the pressure of the first signal pulse has been removed; and FIG. 5 is a view showing the positions of the parts after the pressure of the second signal pulse has been applied and the output member has been shifted back to its original position.

DESCRIPTION OF THE PREFERRED EMBODIMENT

The circuit is generally indicated at 11 in FIG. 1 and comprises a signal line 12 which provides repeated pneumatic pressure pulses to this system. The purpose of circuit 11 is to cause an output member 13 such as a three-way control valve to shift from one position to the other each time pulse pressure is applied at line 12, and to stay in its shifted position when the pulse pressure is removed.

The circuit comprises ten identical normally open three-way valves indicated at 14, 15, 16, 17, 18, 19, 21, 22, 23 and 24. The construction of each valve is shown in FIG. 2. The valve comprises a body 25 and cover plates 26 and 27 at the opposite ends secured to the body by bolts 28. Cover plate 27 retains an insert 29 in body 25, this insert being engageable at one end by a seal 31 carried by a counterbore 32 in the body. Member 29 has an annular slot 33 within which is disposed a seal 34. A supply port 35 is formed in body 25 between seals 31 and 34 and is connected with a central bore 36 in member 29 by an annular groove 37 and a radial passage 38 in member 29.

The inner end of member 29 has a valve seat 39 formed thereon. A spring 40 in bore 36 of member 29 urges a valve disc 41 away from seat 39 and against another seat 42 surrounding a central passage 43 in body 25. An output port 44 is formed in body 25 adjacent seat 39, so that pressure at either port 35 or 44 will press rubberlike disc 41 against seat 42. An exhaust port 45 is formed in body 25 connecting with a bore 46 which leads to seat 42 through bore 43.

A piston 47 is disposed in bore 46, forming a chamber 48 therein to which is connected a signal port 49. Piston 47 is movable between the position shown in FIG. 2, as limited by cover plate 26, and a position against disc 41, forcing this disc away from seat 42 and against seat 39. The diameter of bore 46 is greater than that of seats 39 and 42, so that signal pressure will overcome the supply pressure at port 35 or the pressure from port 44 plus the force of spring 40, which presses disc 41 against seat 42.

Signal line 12 leads to the signal ports 49 of valves 17, 18, 19 and 21. It also has a branch 51 leading to the supply port 35 of valve 14, and the output port 44 of this valve is connected by a line 52 to the signal port 49 of valve 15. This valve also has a constant pressure connection 53 to its supply port 35. The output port 44 of valve 15 is connected to the supply port of valve 16 by a line 54. A line 55 connects the output port of valve 16 to the signal port of valve 13 as well as the signal port of valve 24 and the supply port of valve 21. A line 56 connects the output ports of valves 21 and 19, and a line 57 connects the supply port of valve 19 with the signal port of valve 22.

A branch 58 from line 12 is connected to the supply port of valve 22, and a line 59 connects the output port of valve 22 with the signal port of valve 23. The supply port of valve 23 is connected to a constant pressure line 61, and the output port to a line 62 which connects it with the supply port of valve 24. The output port of valve 24 is connected by a line 63 to the signal port of valve 16 and the supply port of valve 18. The output ports of valves 17 and 18 are connected by a line 64, and a line 65 connects the supply port of valve 17 and the signal port of valve 14. Output valve 13 has a supply port connected to a line 66 and a line 67 connected to the output port.

The operation of circuit 11 is as follows:

Starting with a condition in which output valve 13 is in its exhaust position, as shown in FIG. 1, and no pressure is applied at signal line 12 but with constant pressure being applied at lines 53, 61 and 66 as stated above, pressure will exist in lines 54, 55, 56, 57 and 62 with the valves in their FIG. 1 positions. It will be noted that valves 14, 15, 16, 17, 18, 19, 21 and 23 will be in their open or supply positions while valves 22 and 24 are in their closed or exhaust positions. Pressure will exist in lines 54, 55, 56 and 57 leading to the signal ports of valves 22 and 24. However, since line 63 is exhausted through valve 24, no pressure will exist in lines 64 or 65.

Upon application of signal pressure to line 12, valves 15, 17, 18, 19 and 21 will be shifted to their closed or exhaust positions. Shifting of valve 15 will cause lines 54 and 55 to be exhausted. This will cause control valve 13 to shift to its open position as shown in FIG. 3. Shifting of valves 19 and 21 to their closed positions however will prevent line 57 from being exhausted so that air will be trapped in this line, holding valve 22 in its exhaust position and thereby holding valve 23 in its supply position. Thus, pressure will be applied through line 62 and open valve 24 to line 63, shifting valve 16 to its exhaust position as shown in FIG. 3.

The parts will remain in the FIG. 3 position until the signal pressure at line 12 has been removed. Upon relief of the signal pressure at line 12, valves 15, 17, 18, 19 and 21 will be returned to their open or supply positions as shown in FIG. 4. The pressure in line 57 will be exhausted by flowing from port 35 to port 44 of valve 19, hence through line 56 and ports 44 and 35 of valve 21, through line 55 and valve 16 to exhaust. This will permit valve 22 to shift to its open or supply position, although valve 23 will not be shifted thereby since no signal pressure exists. Pressure will thereby be maintained in line 63, thus holding valve 16 in its exhaust position and maintaining the position of control valve 13. Shifting of valves 17 and 18 to their open position will permit pressure to be applied to line 65, shifting valve 14 to its exhaust position as shown in FIG. 4. This will permit valve 15 to return to its open position although the pressure from line 53 will have no immediate effect because of the closed position of valve 16.

The second application of signal pressure to line 12 will cause valves 17, 18, 19 and 21 to be shifted to their closed or exhaust positions and valve 23 shifted to its exhaust position through valve 22 and line 59, as shown in FIG. 5. Since valve 24 is in its open position as seen in FIG. 4, the shifting of valve 23 to its exhaust position will result in line 63 being exhausted. This in turn will permit valve 16 to shift to its open position, so that the pressure from line 53 passing through valve 15 and line 54 will be applied to line 55 and shift control valve 13 to its open or exhaust position as shown in FIG. 5. At the same time, valve 24 will be shifted to its exhaust position by pressure through line 55. Exhaustion of line 63 by the shifting of valve 23 will not occur before valves 17 and 18 will have shifted to their closed position. Thus, pressure will be retained in line 65 so that valve 14 remains in its closed or exhaust position. This will assure that valve 15 remains in its open position so that pressure is maintained in line 55 which holds control valve 13 in its exhaust or closed position.

Upon removal of the second application of signal pressure from line 12, the parts will return to their FIG. 1 position. That is, valves 17, 18, 19 and 21 will return to their open positions, the movement of valves 17 and 18 permitting line 65 to be exhausted through line 63 and valve 24. This will permit valve 14 to shift to its open position, although this will not affect the position of valve 15 because there is no signal pressure. Thus, the pressure from line 53 will still be applied through valve 15, line 54, valve 16 and line 55 to signal port 49 of control valve 13, maintaining the control valve in its closed or exhaust position. The pressure in line 55, plus the shifting of valves 19 and 21 to their open positions, will cause shifting of valve 22 to its exhaust position, thereby permitting valve 23 to shift to its open or supply position. However, this will have no immediate effect since valve 24 remains in its closed position, but the valves will be in readiness for the next application of signal pressure which will start repetition of the cycle described above.

It will be observed that line 63 may be considered a second output line since its pressurization and exhaustion are always exactly the opposite of first output line 55. Thus, a second controlled member 68 shown in dot-dash lines could be connected to output line 63, similarly to controlled member 13 which is connected to output line 55. Either or both of controlled members 13 and 68 could be connected to the circuit, and if both are connected, they will operate simultaneously but in opposite directions.

A summary of a complete cycle of operation for the various lines is shown below:

|  |  | Signal 12 | Line 52 | Line 54 | Line 55 | Line 57 | Line 59 | Line 62 | Line 63 | Line 65 | Output 67 |
|---|---|---|---|---|---|---|---|---|---|---|---|
| First actuation | Figure 1 | E | E | P | P | P | E | P | E | E | E |
|  | Figure 3 | P | P | E | E | P | E | P | P | E | P |
|  | Figure 4 | E | E | P | E | E | P | P | P | P | P |
| Second actuation | Figure 5 | P | E | P | P | E | P | E | E | P | E |
|  | Figure 1 | E | E | P | P | P | E | P | E | E | E |
| Repeat 1st actuation | Figure 3 | P | P | E | E | P | E | P | P | E | P |
|  | Figure 4 | E | E | P | E | E | P | P | P | P | P |
| Repeat 2d actuation | Figure 5 | P | E | P | P | E | P | E | E | P | E |
|  | Figure 1 | E | E | P | P | P | E | P | E | E | E |

NOTE.—P=pressurized; E=exhausted.

The valves referred to in claims 4 through 9 are as follows:

| Reference in claims 4–9 | Reference numeral in drawings | |
|---|---|---|
| | If output line is 55 | If output line is 63 |
| First valve | 16 | 24 |
| Second valve | 15 | 23 |
| Third valve | 21 | 18 |
| Fourth valve | 19 | 17 |
| Fifth valve | 18 | 21 |
| Sixth valve | 17 | 19 |
| Seventh valve | 14 | 22 |
| Eighth valve | 23 | 15 |
| Ninth valve | 24 | 16 |
| Tenth valve | 22 | 14 |

What is claimed is:

1. In a circuit for shifting a controlled member between two positions in response to successive momentary signal pulses, a signal pulse line, an output line controlling said controlled member, a plurality of substantially identical three-way normally open pressure-operated poppet valves, each of said valves having supply, output and exhaust ports, a signal port, and means responsive to pressure at said signal port for shifting the valves from a position in which said supply and output ports are connected to a position in which the output and exhaust ports are connected, constant pressure connections to the supply ports of two of said poppet valves, and means interconnecting all of said poppet valves with each other and with said signal pulse and output lines whereby, starting with a condition in which pressure from one of said constant pressure connections is applied through two of said poppet valves in series to said output line, application of a first signal pressure will cause both of said two last-mentioned valves to shift to a position exhausting said output line, release of said first signal pressure will cause the second of said two valves to move to its supply position but maintain the exhaust position of said first valve, thereby maintaining the exhaust condition of said output line, application of a second signal pressure will cause said first valve to move to its supply position whereby both valves are open and said pressure source will pressurize the output line, and release of said second signal pressure will still maintain both of said valves in their supply position thereby maintaining the pressurized condition of said output line, said signal pulse line being connected to the signal ports of third, fourth, fifth and sixth poppet valves, said output line being connected to the supply port of said third poppet valve, the output ports of said third and fourth valves being connected, the output ports of said fifth and sixth valves being connected, said signal pulse line being further connected to the signal port of said second valve through a seventh valve, the supply port of said sixth valve being connected to the signal port of said seventh valve, a line connected to the supply port of said fifth valve and the signal port of said first valve, eighth and ninth valves in series with a second constant pressure source for controlling said last-mentioned line, a connection between said output line and the signal port of said ninth valve, a connection between said signal pulse line and the signal port of said eighth valve, and a tenth valve in said last-mentioned connection, the supply port of said fourth valve being connected to the signal port of said tenth valve.

2. The combination according to claim 1, each of said valves having a body, a relatively narrow bore in said body, a supply port at one end of said bore, a pair of spaced seats in said bore, a valve disc disposed between said seats, the first of said seats separating said supply and output ports, the second seat separating said output and exhaust ports, and a wider bore in said body carrying a signal-actuable member whereby pressure at said supply or output ports without pressure at said signal port will cause said disc to engage said second seat and pressure at said signal port will cause the disc to move against said first seat.

3. The combination according to claim 2, each valve being further provided with a spring urging said valve disc against said second seat.

4. The combination according to claim 1, further provided with a second controlled member, said line which interconnects the supply port of said fifth valve, the signal port of said first valve and the output port of said ninth valve comprising a second output line and controlling said second controlled member, application of said first signal pressure pressurizing said second output line, release of first said signal pressure maintaining the pressurized condition of said second output line, application of said second signal pressure exhausting said second output line, and release of said second signal pressure maintaining the exhausted condition of said second output line.

* * * * *